United States Patent Office 3,644,569
Patented Feb. 22, 1972

3,644,569
TWO-PART ADHESIVES COMPRISING AN ISO-
CYANATE TERMINATED PREPOLYMER,
AN ISOCYANATE REACTIVE MONOMER
AND AN UNSATURATED POLYESTER
Gerhard Joseph Pietsch and Armand Francis Lewis, Fair-
field, Conn., assignors to American Cyanamid Com-
pany, Stamford, Conn.
No Drawing. Filed Nov. 19, 1968, Ser. No. 777,142
Int. Cl. C08f 29/20; C08g 39/10, 41/04
U.S. Cl. 260—835                                    10 Claims

ABSTRACT OF THE DISCLOSURE

A two-part adhesive comprising (1) a saturated polyether or polyester-based. NCO terminated polyurethane resin and a peroxide catalyst and (2) an unsaturated polyester resin and a cross-linking monomer containing an NCO reactive group, is disclosed.

BACKGROUND OF THE DISCLOSURE

The use of polyester resins as components in adhesive compositions is well known to those skilled in the art. These adhesives, while useful for many industrial applications, generally fail in two primary properties which are basic and essential to good, over-all adhesive. That is to say, many commercial adhesives have a slow cure time and/or must be heated to an elevated temperature in order to effect curing thereof. Additionally, conventional polyester adhesives are not useful over a wide temperature range and therefore different formulations must be prepared for different applications.

SUMMARY

We have now found a novel two-part adhesive system which may be rapidy cured at low temperatures, e.g. ambient temperature, and also exhibits a sufficiently long shelf-life so as to enable it to be stored for long periods of time so that the ultimate consumer may make only periodic purchases thereof.

Our novel adhesive systems combine the most attractive properties of polyester resin adhesives with those of polyurethane adhesives to form a unique two-part system. The first part of the adhesive combines the polyurethane resin with the catalytic additive necessary to promote cross-linking of the unsaturated polyester resin in the second part. Since the polyurethane resin is non-reactive in the presence of the peroxide, these two components can be combined into a separate package and sold as such in combination with the second package. The second package contains the polyester resin portion of the adhesive system in combination with a cross-linking monomer containing an NCO reactive group. These two components are also non-reactive in combination with one another and therefore can be packaged into a single unit.

When the ingredients of the two packages are combined, however, the catalytic additive of the first package promotes the cross-linking of the polyester of the second package. Additionally, the NCO reactive ingredients of the second package also reacts with the polyurethane of the first package to effect a cross-linked network thereby forming the ultimate adhesive composition.

Our novel adhesive systems find utility for the bonding of metallic and non-metallic substrates to one another at a temperature ranging from about −40° C. to about 100° C. Examples of metals which may be bonded to one another or to other materials include aluminum, carbon steel, brass, copper, lead, tin and the like. Other materials which may be bonded include wood, leather, paper, glass, plastics and the like.

DESCRIPTION OF THE INVENTION INCLUD-
ING PREFERRED EMBODIMENTS

As mentioned above, the first part of our novel adhesive system comprises (1) a saturated polyether or polyester-based, NCO terminated polyurethane resin and (2) a peroxide catalyst.

Any saturated polyester based or saturated polyether based polyurethane resin may be used in producing the novel adhesives of our invention. Among the reactive organic polyfunctional polyols employed in preparing one class of polyurethane resins used in the practice of our invention by reaction with a suitable isocyanate compound are the polyalkylene ether, thioether, and etherthioether glycols represented by the general formula (I) $\quad\quad\quad\quad HO-(RX)_n-H$ wherein R represents the same or different alkylene radicals containing up to about 10 carbon atoms, X represents oxygen or sulfur, and $n$ is an integer large enough so that the molecular weight of the polyalkylene ether, thioether, or ether-thioether glycol is at least about 500, e.g. from about 500 to about 10,000. The polyalkylene ether glycols included within this general formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like, are preferred.

Polyalkylenearylene ether, thioether and ether-thioether glycols which also have molecular weights ranging from about 500 to about 10,000 but which differ from the above-described polyalkylene glycols in having arylene radicals, such as phenylene, naphthylene and anthrylene radicals, either unsubstituted or substituted, e.g., with alkyl or aryl groups, and the like, in place of some of the alkylene radicals of said polyalkylene glycols may also be employed. Polyalkylenearylene glycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art and forms no part of the present invention per se, it may be mentioned here by way of illustration that polyesters of this type may be prepared by the condensation of a polyhydric alcohol, generally a saturated aliphatic diol such as ethylene glycol, propanediol-1,2, propanediol-1,3, butanediol-1,3, butanediol - 1,4, pentanediol-1,2, pentanediol-1,5, hexanediol - 1,3, hexanediol - 1,6, diethylene glycol, dipropylene glycol, triethylene glycol, tetraethylene glycol, and the like, as well as mixtures of such diols with each other and with minor amounts of polyols having more than two hydroxyl groups, such as saturated aliphatic polyols e.g. glycerol, trimethylol ethane, trimethylol propane, pentaerythritol, sorbitol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, sebacic, malic, phthalic, cyclohexanediocarboxylic and endomethylenetetrahydrophthalic acids, and the like and their isomers, homologs, and other substituted derivatives, e.g., chloro-derivatives.

The essentially linear polyesters commonly used in preparing polyurethane resins preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g. from about 30 to about 700. When preparing these polyesters, an excess of polyol over polycarboxylic acid is generally used to insure that the resulting essentially linear polyester chains contain a sufficient amount of reactive hydroxyl groups.

Another class of suitable organic polyfunctional polyol reactants includes polyalkylene ether polyols containing more than two reactive hydroxyl groups, such as polyalkylene ether triols, tetrols, and the like, which are prepared, for example, by reacting polyols such as glycerol, trimethylol ethane, trimethylol propane, pentaerythritol, dipentaerythritol sorbitol and the like, with lower alkylene oxides such as ethylene oxide, propylene oxide and the like.

Nitrogen-containing polyfunctional polyols may also be used as polyol reactants. Among such materials there are included the polyesteramides conventionally employed in the preparation of polyurethane resins, i.e., those having molecular weights ranging from about 750 to about 3,000, acid numbers ranging from about 60 as a maximum to as low as can be practicably obtained, e.g., 2 or less, and hydroxyl numbers ranging from about 30 to about 700, and also high molecular weight polyamino alcohols, such as hydroxypropylated alkylene diamines of the general formula (II)      $(HOH_6C_3)_2N-R'-N(C_3H_6OH)_2$ wherein R' represents an alkylene radical having from 2 to 6 carbon atoms, inclusive, of which N,N,N',N'-tetrakis-(2 - hydroxypropyl)-ethylenediamine is a representative species, as well as higher analogs thereof, such as hydroxypropylated polyalkylenepolyamines of the general formula (III) 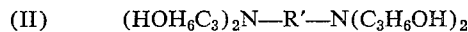

wherein R' is as defined hereinabove (see U.S. Pat. No. 2,697,118 to Lundsted et al.).

As can be readily appreciated, mixtures of the various reactive organic polyfunctional polyols described hereinabove may also be employed in preparing polyurethane resins useful in the practice of the present invention.

Just as in the case of the polyol reactant, the polyurethane resins may be prepared using a wide variety of organic polyisocyanates, among which there are included aromatic diisocyanates, such as m-phenylenediisocyanate, p-phenylenediisocyanate, 4 - t-butyl-m-phenylenediisocyanate, 4-methoxy-m-phenylenediisocyanate, 4-phenoxy-m-phenylenediisocyanate, 4 - chloro-m-phenylenediisocyantoluenediisocyanate (either as a mixture of isomers, e.g., the commercially available mixture of 80% 2,4-toluenediisocyanate and 20% 2,6-toluenediisocyanate, or as the individual isomers themselves), m-xylylenediisocyanate, p-xylylenediisocyanate, cumene - 2,4-diisocyanate, durenediisocyanate, 1,4-naphthylenediisocyanate, 1,5-naphthylenediisocyanate, 1,8-naphthylenediisocyanate, 2,6-napthylenediisocyanate, 1,5-tetrahydronaphthylenediisocyanate, p,p'-diphenyliisocyanate, diphenylmethane-4,4'-diisocyanate, 2,4-diphenylhexane-1,6-diisocyanate, "bitolylenediisocyanate" (3,3' - dimethyl-4,4'-biphenylenediisocyanate), "dianisidinediisocyanate" (3,3' - dimethoxy-4,4'-biphenylenediisocyanate), and methylenepolyisocyanates represented by the general formula (IV) 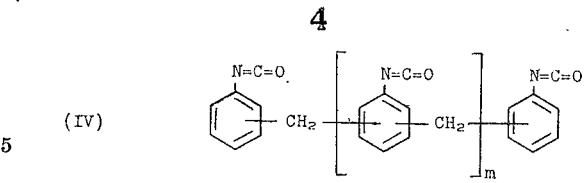

wherein m represents an integer between 0 and about 5, and the like; aliphatic diisocyanates, such as methylenediisocyanate, ethylenediisocyanate, the tri-, tetra-, penta-, hexa-, hepta-, oct-, non- and decamethylene - ω,ω'-diisocyanates, 2-chlorotrimethylenediisocyanate, 2,3-dimethyltetramethylenediisocyanate, and the like, and tri- and higher isocyanates, such as benzene-1,3,5-triisocyanate, toluene - 2,4,6-triisocyanate, diphenyl-2,4,4'-triisocyanate, triphenylmethane-4,4',4''-triisocyanate, and the like. Mixtures of two or more of such organic polyisocyanates may also be employed to prepare the polyurethane resins by reaction with the ethers and esters described above utilizing procedures well known to those skilled in the art, see for example, U.S. Pats. 2,729,618, 3,016,364 and the like.

Examples of these known polyurethane production procedures include the so-called "pre-polymer" technique, as commonly practiced in the production of polyurethane resins, which involves mixing polyol and polyisocyanate under substantially anhydrous conditions, i.e., with usually not more than about 0.2% by weight of water, based on the total weight of the mixture, being present, and with a molar excess of the polyisocyanate over the polyol usually being employed, reacting this mixture at a temperature ranging from about room temperature to about 100° C. for from about 20 minutes to about 18 hours, and then cooling the resulting "prepolymer" to a temperature of from about room temperature to about 60° C.

Modifications and changes which may be made in conventional polyurethane reaction mixtures to provide resins having various degrees of flexibility, rigidity and other properties are so well known in the art that no more than a brief mention of some of them need be made here. Thus, in addition to those previously indicated, i.e., using essentially linear polyesters and polyesteramides having certain specified molecular weights, acid numbers and hydroxyl numbers and varying the mol ratio of polyisocyanate to polyol, numerous other modifications, such as using tri- or higher functional monomeric polyols or polycarboxylic acids in preparing the polyol reactant, using tri- or higher functional polyisocyanates, and the like, have been disclosed in the prior art to the accomplishment of these ends. It is contemplated that any or all of these modifications, together with any other manipulative steps described in prior art processes for the preparation of polyurethane resins may be appropriated to the practice of the present invention.

Among the catalysts which may be utilized in the first part of our novel adhesive system include the acidic peroxides, e.g. benzoyl peroxide, thalic peroxide, succinic peroxide, benzoyl acetic peroxide; fatty oil acid peroxides, e.g. coconut oil acid peroxide, lauric peroxide, stearic peroxide, oleic peroxides; terpene oxides e.g. ascaridole. Additionally, we may utilize such catalysts as azobisisobutyronitrile, mixtures of peroxides and percarbonates as is known in the art and the like. The conentration of the catalyst in the polyurethane resin blend portion of our adhesive systems should range from about 0.1% to about 15.0%, preferably from about 0.5% to about 5.0%, by weight, based on the weight of the polyester resin present in the second part of the adhesive system.

The second part of our novel adhesive systems comprises (3) a polyester resin which is unsaturated as a result of unsaturation in the polyol or polyacid used in the production of said resin and (4) a cross-linking monomer containing an NCO reactive group. The polyester resins employed in the practice of the present invention are all well known in the art and are prepared by reacting polycarboxylic acids, or their anhydrides, with polyhydric alcohol. They are prepared using a procedure wherein at least one of the reactive components contains α,β-ethylenic unsaturation. By following this procedure, resinous, essentially linear esterification or condensation products, containing a plurality of ethylenically unsaturated linkages distributed along the backbones of their polymer chains, are produced.

The use of α,β-ethylenically unsaturated polycarboxylic acids provides a convenient method of introducing ethylenic unsaturation into the polyester resins. It is preferred to employ α,β-ethylenically unsaturated dicarboxylic acids, such as maleic, fumaric, citraconic, γ,γ-dimethylcitraconic, mesaconic, itaconic, α-methylitaconic, γ-methylitaconic, teraconic, and the like, as well as mixtures thereof, but minor amounts of α,β-ethylenically unsaturated polycarboxylic acids containing three or more carboxyl groups, such as aconitic acid and the like, together with the particular α,β-ethylenically unsaturated dicarboxylic acid or acids chosen, may also be used.

Whenever available, the anhydrides of any of the aforementioned α,β-ethylenically unsaturated polycarboxylic acids may be substituted for said acids in whole or in part.

Any of the large class of polyhydric alcohols ordinarily used in preparing reactive polyester resins may be employed in the practice of the present invention. While dihydric alcohols, and espectially saturated aliphatic diols, are preferred as coreactants in the preparation of the polyester resins, it is not mandatory that all of the polyol used be of this type, in that small amounts, e.g., usually up to about 10% of the total equivalents of hydroxyl groups present in the esterification mixture, of polyols having more than two hydroxyl groups may also be employed. Among the dihydric alcohols which may be employed are saturated aliphatic diols such as ethylene glycol, propylene glycol, butylene glycol, diethylene glycol, dipropylene glycol, triethylene glycol, tetraethylene glycol, butanediol-1,2, butanediol-1,3, butanediol-1,4, pentanediol-1,2, pentanediol-1,3, pentanediol-1,4, pentanediol-1,5, hexanediol-1,2, hexanediol-1,3, hexanediol-1,4, hexanediol-1,5, hexanediol-1,6, neopentyl glycol, and the like, as well as mixtures thereof. Among the polyols having more than two hydroxyl groups which may be employed in minor amounts, together with the above-mentioned diols, are saturated aliphatic polyols such as glycerol, trimethylol ethane, trimethylol propane, pentaerythritol, dipentaerythritol, arabitol, xylitol, dulcitol, adonitol, sorbitol, mannitol, and the like, as well as mixtures thereof.

Among the halogenated polyols that may be employed are 2,2'-chloromethylpropanediol-1,3, adducts of hexachlorocyclopentadiene with unsaturated polyols, such as butenediols, pentenediols, and the like, and adducts of hexachlorocyclopentadiene with polyols having three or more hydroxyl groups, one of which is etherified with an unsaturated alcohol reactive with hexachloro-cyclopentadiene. Among the latter are compounds such as 3-[1,4,5,6,7,7-hexachlorobicyclo-(2.2.1) - 5 - hepten-2-yloxy-1,2-propanediol, which is the adduct of hexachloro-cyclopentadiene with vinyl glycerol ether, 3-[1,4,5,6,7,7-hexachlorobicyclo(2.2.1) - 5 - hepten-2-yl]-methoxy-1,2-propanediol, which is the adduct of hexachlorocyclopentadiene with allyl glycerol, adducts of hexachlorocyclopentadiene with vinyl and allyl ethers of pentaerythritol, and the like. Mixtures of these halogenated polyols may also be employed, if desired.

The esterification mixtures, from which the polyester resins employed in the practice of the present invention are prepared, are generally formulated so as to contain at least a stoichiometric balance between carbonyl and hydroxyl groups. Thus, where a diol and a dicarboxylic acid are employed, they are usually reacted on at least a mol to mol basis. In common commercial practice, a small excess of polyol, usually in the range of from about 5% to about 15% excess is employed. This is done primarily for economic reasons, i.e. to insure a rapid rate of esterification.

The polyester resins used in the practice of the present invention are formed in the manner customarily observed in the art. Thus, the particular polycarboxylic acid or acids and polyol or polyols employed are reacted at elevated temperatures and atmospheric pressure. Since resinifying reactants of this type are prone to develop undesirable color when in contact with air at elevated temperatures, it is generally considered good practice to conduct the esterification reaction in an inert atmosphere, such as can be obtained by bubbling an inert gas, e.g., carbon dioxide, nitrogen, and the like, through the esterification mixture. The reaction temperature is not critical, thus, the reaction will preferably be carried out at a temperature which usually will be just below the boiling point of the most volatile component of the reaction mixture, generally the polyol.

The esterification mixture should be sufficiently reacted so as to utlimately produce a polyester resin having an acid number not appreciably more than about 75. It is preferred to employ polyester resins having acid numbers ranging from about 5 to about 30, or below.

Further details pertaining to the preparation of polyester resins of the types employed in the practice of the present invention are disclosed in U.S. Pat. No. 2,255,313, to Ellis, and in U.S. Pat. Nos. 2,443,735 to 2,443,741, inclusive, to Kropa, and these patents are hereby incorporated into the present application by reference.

The second component in the second part of our novel adhesive compositions, as mentioned above, is a cross-linking monomer which contains an NCO reactive group. The function of this material is to assist in the cross-linking of the polyester resin and also to react with the available NCO groups of the polyurethane prepolymer present in part one of the adhesive system. The compounds utilized for this purpose may therefore contain, as substituents reactive with the NCO groups, hydroxy groups NH groups, COOH groups, $SO_3H$ groups and the like. Examples of compounds useful for this purpose include β-hydroxyethyl methacrylate or acrylate, acrylic or methacrylic acid, vinylsulfonic acid, tertiarybutyl-aminoethylmethacrylate and the like.

The concentration of the NCO reactive compound in part two of the adhesive system ranges from about 1% to about 25%, preferably from about 2% to about 15%, by weight, based on the weight of the polyester resin.

The ratio of the second part of the adhesive system to the first part thereof should range from about 9.0 parts to about 0.5 part to about 0.5 part to about 9.0 parts, respectively, preferably from about 2 parts to 6 parts to about .30 part to 2.4 parts.

The second portion of our adhesive system may also be modified by the addition of a second monomer to assist in the cross-linking thereof. For this purpose, any monomeric compound containing the polymerizable $CH_2\!\!=\!\!C\!<$ group may be utilized.

The monomeric material containing the polymerizable $CH_2\!\!=\!\!C\!<$ group which may be used in the practice of the present invention, has a boiling point of at least 60° C. Among the polymerizable monomeric materials that will find use in our invention are styrene, side chain alkyl and halo substituted styrenes such as alpha-methylstyrene, alpha-chlorostyrene, alpha-ethylstyrene and the like or alkyl and halo ring-substituted styrenes such as ortho, meta and para-alkyl styrenes such as o-methylstyrene, p-ethylstyrene, meta-propylstyrene, 2,4-dimethylstyrene, 2,5-diethylstyrene, bromostyrene, chlorostyrene, dichlorostyrene, and the like.

The concentration of this cross-linking monomer should range from about 10% to about 70%, preferably from about 20% to about 50%, by weight, based on the weight of said polyester resin.

A further alternative component which may be utilized in the second part of our novel adhesive system is a catalyst which promotes the reaction of the NCO group of the polyurethane resin in the first part with the NCO group reactive compound present in the second part. Compounds suitable for this purpose include triethylene diamine, metal salts, e.g., Ti, Pb, Bi, Sn, compounds, tertiary amines, acids and the like (see High Polymers XVI Polyurethanes, Chemistry and Technology; J. H. Saunders, K. C. Frisch, Part I, Interscience Publishers, pp. 163–171) which article is hereby incorporated herein by reference.

This component is present in an amount ranging from about 0.1% to about 10.0%, preferably from about 0.1% to about 5.0%, by weight, based on the weight of the polyurethane resin in the first part of the adhesive system.

We have also found that a peroxide promoter may be added to the second part of our adhesive systems in order to increase the time of the reaction of the cross-linking of the polyester resin. Examples of promoters which may be utilized for this purpose include tertiary aromatic amines, e.g., dimethyltoluidine, dimethylaniline, diethylaniline, etc. Amounts of these materials which may be utilized range from about 0.01% to about 5.0%, preferably from about 0.01% to about 2.0%, by weight, based on the weight of the polyester resin.

As mentioned above, when the first part of our adhesive system is blended with the second part, utilizing any known blending technique such as a Hobart mixer, etc., the unsaturated cross-linking monomer and the NCO group reactive compound function to cross-link the polyester resin, the cross-linking being catalyzed by the peroxide of the first part and promoted by the promoter of the second part. At the same time, the NCO reactive group reacts with the NCO group of the polyurethane prepolymer thereby forming a dense, cross-linking network which possesses attractive adhesive properties as set forth below in the examples. As can be readily appreciated, while the first part and the second part are packaged individually, no reaction occurs, but when the components are blended together, a multiplicity of reactions take place and form the resultant adhesive. A further feature of our novel adhesives resides in the fact that all of these reactions take place at room temperature and therefore no extraneous heat is needed in order to produce the desired product. Slight heating may be utilized, however, if desired in order to increase the reaction time during application.

The adhesives produced from the above components, as mentioned above, are useful for many purposes. We have also found that various other materials may be added to the second part of the system in order to render the resultant adhesive more desirable for a specific application. For example, an epoxy resin may be added thereto in amounts ranging from about 1.0% to about 25.0% by weight, based on the weight of the polyester resin in order to increase the resistance of the resultant adhesive to solvents such as toluene, acetic acid, etc. and also to increase the peel strentgh of the resultant system. These unsaturated epoxy resins generally are (1) solids at 23° C., (2) have an iodine number of at least 100 and (3) have an epoxide equivalent weight in the range of from 400–6000 (number of grams of resin containing 1 gram mole of epoxide). A particularly useful unsaturated epoxy resin, is a partially epoxidized polybutadiene having an epoxide equivalent weight of 177, 2.5%, by weight, of hydroxyl and an iodine number of 185.

We may also use dihydric phenol, e.g., bisphenol A-epichlorohydrin reaction products herein as well as any other known polymer which falls into the general category of epoxy resins. For example, such resinous epoxy materials as those having the formula:

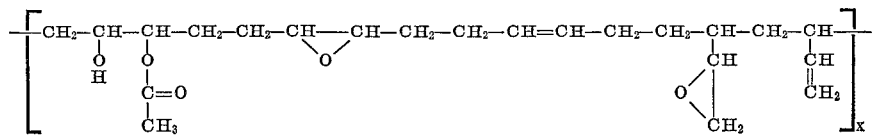

wherein $x$ is at least 2, and those having the formula

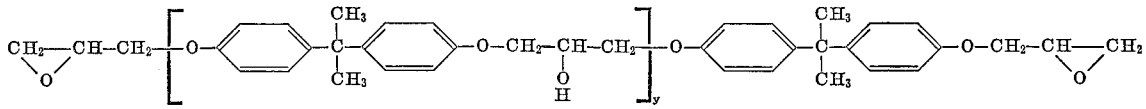

wherein $y$ is at least 1. These polymeric epoxides are well known in the art, as are methods for their production.

Another additive which may be utilized in the second part of our novel adhesive systems to provide a system having a special application, comprises a phenoxy resin such as that produced by the reaction of a dihydric phenol with epichlorohydrin. These resins are well known in the art as disclosed in U.S. Pat. No. 3,238,087, said patent hereby being incorporated herein by reference. Concentrations of this component should range from about 1.0% to about 15.0%, by weight, again based on the weight of the polyester resin.

Additional materials such as dimethacrylates or divinyl compounds such as divinyl benzene, may be added to the second part for purposes of forming a high cross-linked density, in amounts ranging from about 1 to 5%, by weight, based on the weight of the polyester resin.

The following examples are set forth for purposes of illustration only and are not to be construed as limitations on the instant invention except as set forth in the appended claims. All parts and percentages are by weight unless otherwise specified.

EXAMPLE 1

Part A

To a suitable mixing vessel are charged a commercially available saturated polyester based, NCO terminated polyurethane prepolymer (10.9% NCO content), 6% of benzoyl peroxide and 6% of di(t-butyl cyclohexyl) percarbonate. The ingredients are blended thoroughly and the resultant blend is divided into two parts, A and A¹.

Part B

To a second suitable mixing vessel are added 62.2 parts of a commercially available unsaturated polyester resin (produced from 5.8 moles of diethylene glycol, 0.5 mole of dipropylene glycol, 5.0 moles of isophthalic acid and 1.0 mole of maleic anhydride), 33.5 parts of styrene, 3.0 parts of β-hydroxyethyl methacrylate, 1.0 part of triethylene diamine and 0.3 part of dimethyl aniline. The ingredients are again thoroughly mixed and the resultant mixture is divided into two parts, B and B¹.

Parts A and B are then compounded at a ratio of Part B to Part A of about 4:1, respectively.

The resultant composition is coated onto two aluminum plates and the coated surfaces are pressed together under slight pressure for 24 hours at room temperature. The resultant bonded laminate is then cut into 5 sections and each is tested. The results are set forth in Table I, below.

TABLE I

| Sample | Temperature, °C. | Lap shear strength, p.s.i. |
|---|---|---|
| 1 | −40 | 2,700–4,800 |
| 2 | 0 | 2,700–3,700 |
| 3 | +23 | 2,900–3,600 |
| 4 | +75 | 660–700 |
| 5 | +100 | 150–190 |

The two remaining portions of Parts A and B are then packaged and stored. After 2 months, the ingredients of the packages are admixed as described above. Results similar to those set forth above are observed when the resultant composition is utilized as an aluminum-aluminum bonding adhesive.

EXAMPLES 2–4

Following the procedure of Example 1, except that various additives are incorporated into the adhesive composition, a series of compositions are prepared and tested. The results are set forth in Table IIA, below.

TABLE IIA

| Ex. | Part A | Part B |
|---|---|---|
| 2 | Polyurethane prepolymer of Example 1 plus 16% benzoyl peroxide. | 90 parts of polyester resin of Example 1; 3.0 parts β-hydroxyethyl methacrylate; 5.0 parts of a commercially available epoxy resin; 2.0 parts of $SrCrO_4$; 0.5 part of triethylene diamine; 0.3 part of dimethyl toluidine. |
| 3 | do | 80.6 parts of polyester resin of Ex. 1; 2.77 parts of β-hydroxyethyl methacrylate; 4.6 parts of tetraethyleneglycol dimethacrylate; 4.2 parts of a commercially available dihydric phenol-epichlorohydrin reaction product; 5.0 parts of the epoxy resin of Ex. 2; 2.0 parts of $SrCrO_4$; 0.5 part of triethylene diamine; 0.3 part of dimethyl toluidine. |
| 4 | Polyurethane prepolymer of Example 1 plus 16% benzoyl peroxide. | 91.3 parts of the polyester resin of Ex. 1; 3.0 parts of β-hydroxyethyl methacrylate; 5.0 parts of tetraethylene glycol dimethacrylate; 4.2 parts of the epichlorohydrin reaction product of Ex. 3; 0.5 part of triethylene diamine; 0.3 part of dimethyl toluidine. |

Parts A and B of each of Examples 2–4 are then blended in a ratio of 1:4, respectively, used as an adhesive for a series of aluminum-aluminum laminates as in Example 1, and subjected to a series of tests. The results are set forth in Table IIB, below.

TABLE IIB

| Properties as a result of tests | Adhesive composition of— | | |
|---|---|---|---|
| | Example 2 | Example 3 | Example 4 |
| Lap shear strength: | | | |
| −40° C. | 1,480–1,500 | 1,860–2,140 | 3,350–3,760 |
| −20° C. | 2,580–4,000 | 2,040–2,520 | |
| −6° C. | 4,200–4,660 | 3,980–3,860 | |
| +23° C. | 4,120–4,140 | 4,240–4,400 | 3,620–3,790 |
| +40° C. | 2,300–2,640 | 2,880–2,940 | 2,160–2,180 |
| +60° C. | 1,140–1,260 | 1,300–1,570 | |
| +75° C. | | | 750–874 |
| +98° C. | 300 | 470–490 | |
| Lap shear strength after: | | | |
| Salt spray exposure: | | | |
| 0 weeks | 4,000–4,080 | 4,400–4,400 | 3,120–3,440 |
| 4 weeks | 3,120–3,600 | 2,400–3,500 | 480–880 |
| $H_2O$ immersion at R.T.: | | | |
| 0 weeks | 3,650–4,160 | 2,400–2,800 | 3,040–3,520 |
| 4 weeks | 3,600–3,600 | 1,600–1,600 | 3,920–4,000 |
| Toluene immersion at R.T.: | | | |
| 0 weeks | 3,840–4,160 | 2,800–2,160 | 3,080–3,200 |
| 4 weeks | 1,600 | 1,280 | 2,080–2,240 |
| Acetic acid immersion at R.T.: | | | |
| 0 weeks | 4,000–4,080 | 2,800 | 3,200–3,500 |
| 4 weeks | 160–240 | 240 | 2,240–2,720 |
| 5% $NH_4OH$ immersion at R.T.: | | | |
| 0 weeks | 3,280–3,760 | 2,700–2,800 | |
| 4 weeks | 2,960–3,440 | 1,280–1,800 | |
| Isopropane immersion at R.T.: | | | |
| 0 weeks | 3,920–3,920 | 2,700–2,800 | 2,640–3,520 |
| 4 weeks | 3,760–3,840 | 2,080–2,480 | 3,680–3,840 |
| Motor oil #3 immersion at R.T.: | | | |
| 0 weeks | 4,000–4,160 | 2,720–2,770 | 3,280–3,280 |
| 4 weeks | 3,760–4,000 | 2,400–3,040 | 3,680–3,920 |
| ASTM fuel A immersion at R.T.: | | | |
| 0 weeks | 4,000–4,080 | 2,640 | |
| 4 weeks | 3,920–3,920 | 1,600 | |
| Cleavage impact: | | | |
| Aluminum/aluminum | 0.16–0.18 | 0.10–0.12 | 0.20–0.24 |
| Carbon steel/carbon steel | 0.14–0.22 | 0.02–0.02 | 0.40–0.15 |
| Peal strength, p.p.i.; Aluminum/aluminum | 9–11 | 2–4 | 1–2 |
| Tensile strength, p.s.i.: | | | |
| Aluminum/aluminum at 50° C.—100% R.H. | 4,680–4,920 | | 3,460–3,280 |
| 0 weeks | 4,000–4,000 | | 2,960–2,960 |
| 4 weeks | 880, 2,320 | | 20 |

EXAMPLE 5

The procedure of Example 1 is again followed except that an equivalent amount of a saturated polyether-based polyurethane resin is used in Part A. Similar results are observed.

EXAMPLE 6

The procedure of Example 2 is again followed except azobisisobutyronitrile is substituted for the benzoyl peroxide of Part A and acrylic acid is used in place of the hydroxyethyl methacrylate in Part B. An excellent adhesive composition resulted.

EXAMPLE 7

The procedure of Example 3 was followed except that t-butylaminoethyl methacrylate was substituted for the hydroxyethyl methacrylate thereof in Part B. 4.0 parts of styrene were also added thereto. The resultant adhesive was comparable to that of Example 3.

EXAMPLE 8

The procedure of Example 4 was followed except that the triethylene diamine was replaced by a titanium compound as catalyst. An excellent adhesive is produced.

We claim:
1. A curable reaction product resulting from the admixture of (1) (A) a saturated polyether or polyester-based, NCO terminated polyurethane resin, said polyether or polyester having a molecular weight of at least about 750, (B) from about 0.1% to about 15.0% by weight, based on the weight of (C), of a peroxide catalyst and (2) (C) an unsaturated polyester resin, (D) from about 1.0% to about 25.0%, by weight, based on the weight of (C), of an unsaturated cross-linking monomer containing an NCO reactive group, (E) from about 10% to about 70%, by weight, based on the weight of (C), of a second different unsaturated cross-linking monomer void of NCO reactive groups, the ratio of (1) to (2) ranging from about 9–0.5: 0.5–9, respectively.

2. A product according to claim 1 wherein (2) contains (F) from about 0.01–5.0%, by weight, based on the weight of (C), of a peroxide promoter.

3. A product according to claim 1 wherein (2) contains (G) from about 0.1–10.0%, by weight, based on the weight of (C), of a catalyst which promotes reaction of an NCO group with an NCO group reactive material.

4. A product according to claim 1 wherein said (2) contains (H) from about 1.0–25.0%, by weight, based on the weight of (C), of an epoxy resin.

5. A product according to claim 1 wherein said (2) contains (I) from about 1.0–15.0%, by weight, based on the weight of (C), of a dihydric phenolepichlorohydrin reaction product.

6. A product according to claim 1 wherein said (D) is β-hydroxyethyl methacrylate.

7. A product according to claim 1 wherein said (2) contains β-hydroxyethyl methacrylate, an epoxy resin, triethylene diamine and dimethyl toluidene.

8. A product according to claim 1 wherein said (E) is styrene.

9. The cured reaction product of claim 1.

10. The cured reaction product of claim 3.

References Cited
UNITED STATES PATENTS

| 2,915,493 | 12/1959 | Nischk et al. | 260—859 |
| 3,136,733 | 6/1964 | Ross et al. | 260—859 |
| 3,158,586 | 11/1964 | Krause | 260—830 |
| 3,316,324 | 4/1967 | Mendoyanis | 260—830 |
| 3,455,857 | 7/1969 | Holzrichter | 260—859 |
| 3,457,324 | 7/1969 | Sekmakas | 260—859 |
| 3,509,234 | 4/1970 | Burlant et al. | 260—859 |

JOHN C. BLEUTGE, Primary Examiner

U.S. Cl. X.R.

156—330, 331, 332; 161—184, 185, 186, 190; 260—830 P, 858, 859 R

UNITED STATES PATENT OFFICE
CERTIFICATE OF CORRECTION

Patent No. 3,644,569  Dated February 22, 1972

Inventor(s) GERHARD JOSEPH PIETSCH and ARMAND FRANCIS LEWIS

It is certified that error appears in the above-identified patent and that said Letters Patent are hereby corrected as shown below:

Column 1, line 15, after the word "polyester-based" and before the term "NCO," please delete the period (.) and insert in lieu thereof a comma (,).

Column 1, line 26, the word "adhesive" should read --adhesives--.

Column 2, line 71, the word "cyclohexanediocarboxylic" should read --cyclohexanedicarboxylic--.

Column 3, line 45, please insert a single bond (—) between N and R' in formula (III).

Column 3, line 70, please change "p,p'-diphenyliisocyanate" to read --p,p'-diphenyldiisocyanate--.

Column 5, line 25, please change "espectially" to read --especially--.

Column 5, line 55, please insert a closing bracket (]) after the term "-hepten-2-yloxy."

Column 5, line 68, the word "carbonyl" should read --carboxyl--.

Column 6, line 38, please insert a comma (,) after the word "groups" and before the term "NH."

Column 7, line 67, the word "strentgh" should read --strength--.

Column 9, line 67, the figure "0.40" should read --0.04--.

Column 10, line 4, please insert the word --that-- after the word "except."

Signed and sealed this 19th day of September 1972.

(SEAL)
Attest:

EDWARD M. FLETCHER, JR.
Attesting Officer

ROBERT GOTTSCHALK
Commissioner of Patents